(12) United States Patent
Makarian et al.

(10) Patent No.: US 8,276,546 B2
(45) Date of Patent: Oct. 2, 2012

(54) PET WASHING APPARATUS AND METHOD

(76) Inventors: Tigran Makarian, NYC, NY (US);
Araksia Makarian, Cranston, RI (US);
Christopher Arsenian, Woodbridge, VA (US); Gary Samunjan, Englewood Cliffs, NJ (US)

( * ) Notice: Subject to any disclaimer, the term of this patent is extended or adjusted under 35 U.S.C. 154(b) by 29 days.

(21) Appl. No.: 12/800,475

(22) Filed: May 14, 2010

(65) Prior Publication Data
US 2010/0288205 A1 Nov. 18, 2010

Related U.S. Application Data

(60) Provisional application No. 61/216,164, filed on May 14, 2009.

(51) Int. Cl.
*A01K 29/00* (2006.01)
(52) U.S. Cl. .......................... 119/671; 119/673
(58) Field of Classification Search ............... 119/600, 119/604, 671, 673, 603, 606, 668, 665; D30/158
See application file for complete search history.

(56) References Cited

U.S. PATENT DOCUMENTS

| | | | | |
|---|---|---|---|---|
| 854,293 A * | 5/1907 | Kramer | ............... | 294/82.2 |
| 3,734,058 A * | 5/1973 | Hightower et al. | ........... | 119/201 |
| 3,749,064 A | 7/1973 | Weinstein et al. | | |
| 3,941,092 A * | 3/1976 | Winters | ............... | 119/497 |
| 4,083,328 A * | 4/1978 | Baker | ............... | 119/673 |
| 4,930,453 A | 6/1990 | Laliberte | | |
| 5,193,487 A * | 3/1993 | Vogel | ............... | 119/671 |
| 5,243,931 A | 9/1993 | McDonough | | |
| 5,279,257 A | 1/1994 | Temby | | |
| D345,632 S * | 3/1994 | McLaughlin | ............... | D30/158 |
| 5,632,231 A * | 5/1997 | Moore | ............... | 119/671 |
| 6,688,257 B2 * | 2/2004 | Lee | ............... | 119/671 |
| 7,107,937 B1 * | 9/2006 | Anderson | ............... | 119/671 |
| 7,421,978 B2 | 9/2008 | Price | | |

OTHER PUBLICATIONS

International Search Report and Written Opinion mailed Jul. 6, 2010 (issued in PCT Application No. PCT/US10/01433).

* cited by examiner

*Primary Examiner* — Monica Williams
(74) *Attorney, Agent, or Firm* — Alberto Q. Amatong, Jr.; The Amatong Law Firm, PLLC

(57) ABSTRACT

Disclosed is a pet washing apparatus having a base including a washing floor board for positioning a pet and a top part connectible with the lower base. The top part further includes a cover positionable at least partly over the floor board to define, at least partly, a contained wash space. Preferably, the washing apparatus also includes a nozzle supported on the cover and operably positioned to spray downwardly onto the base and pet positioned in the wash space.

13 Claims, 4 Drawing Sheets

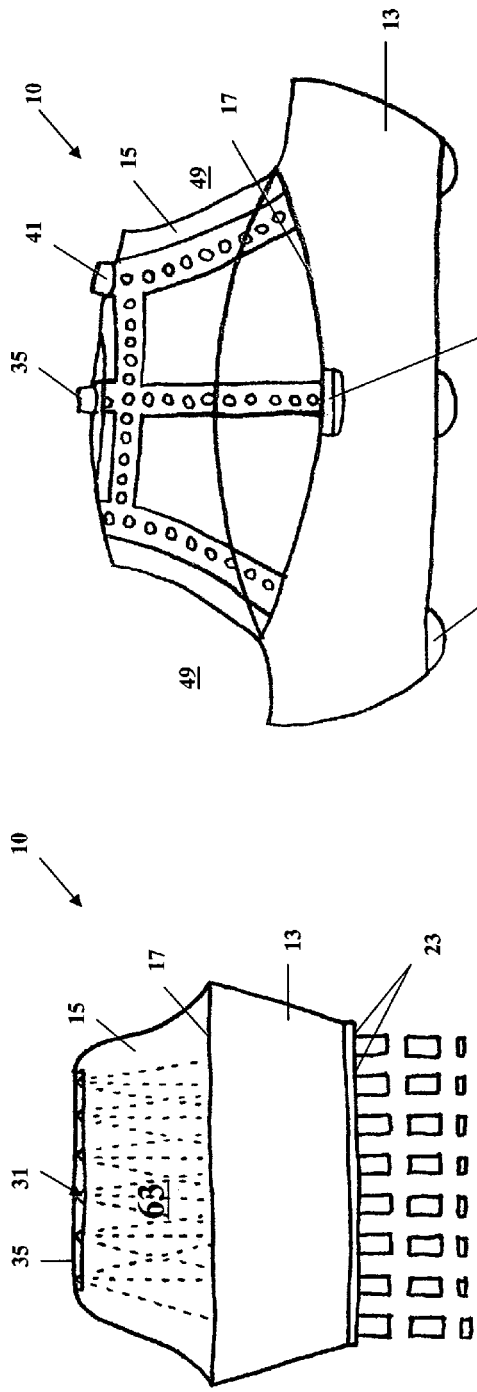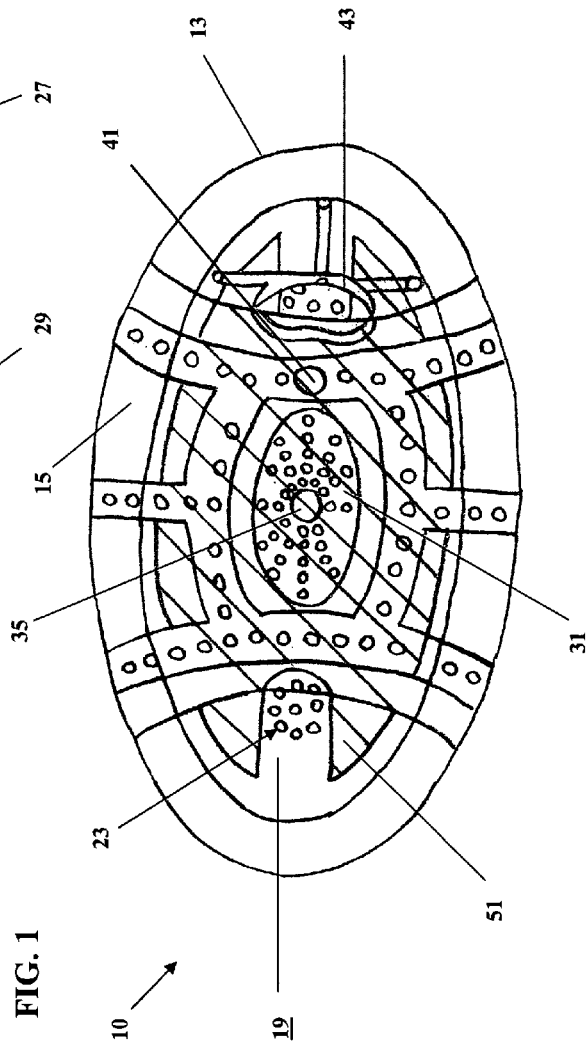

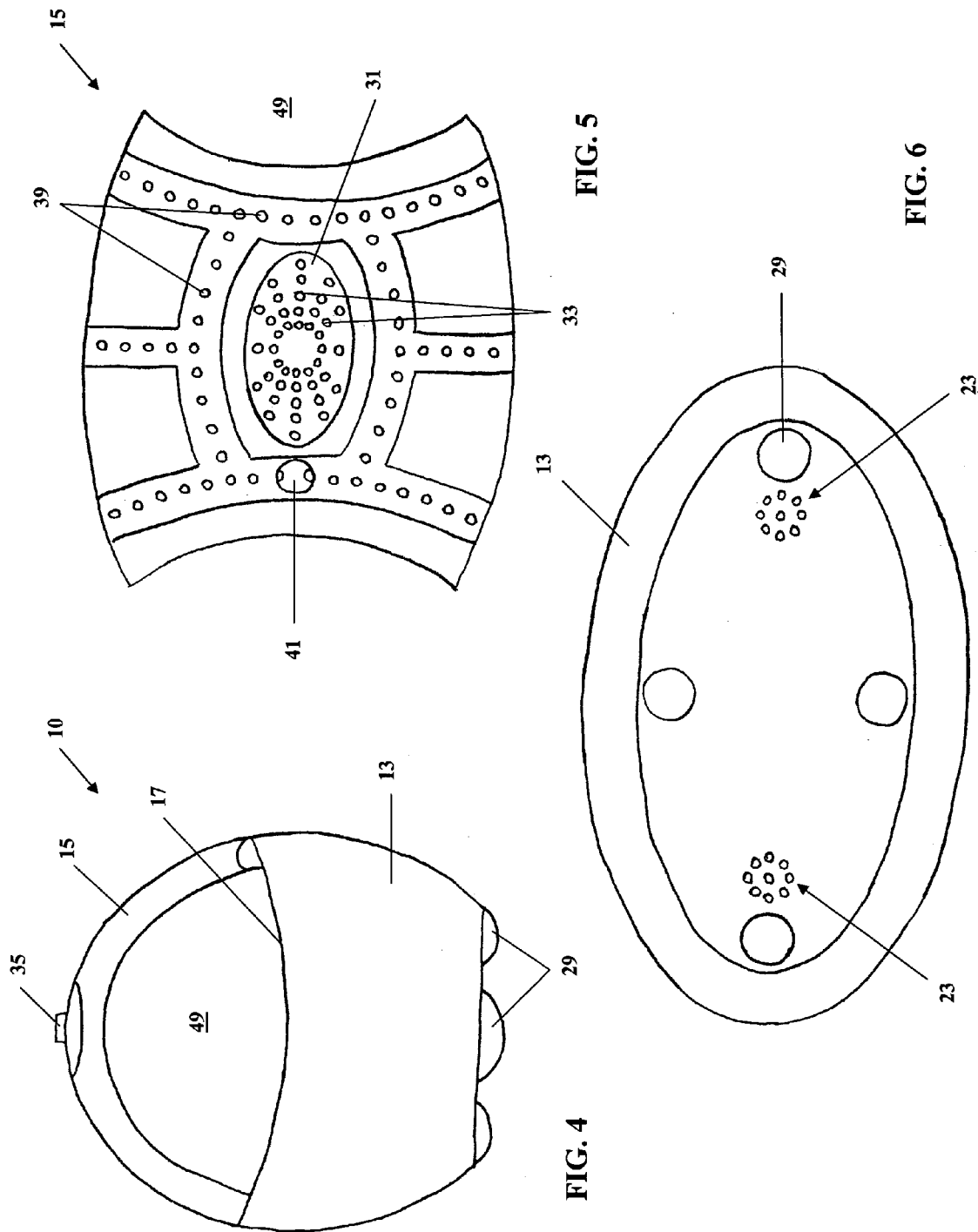

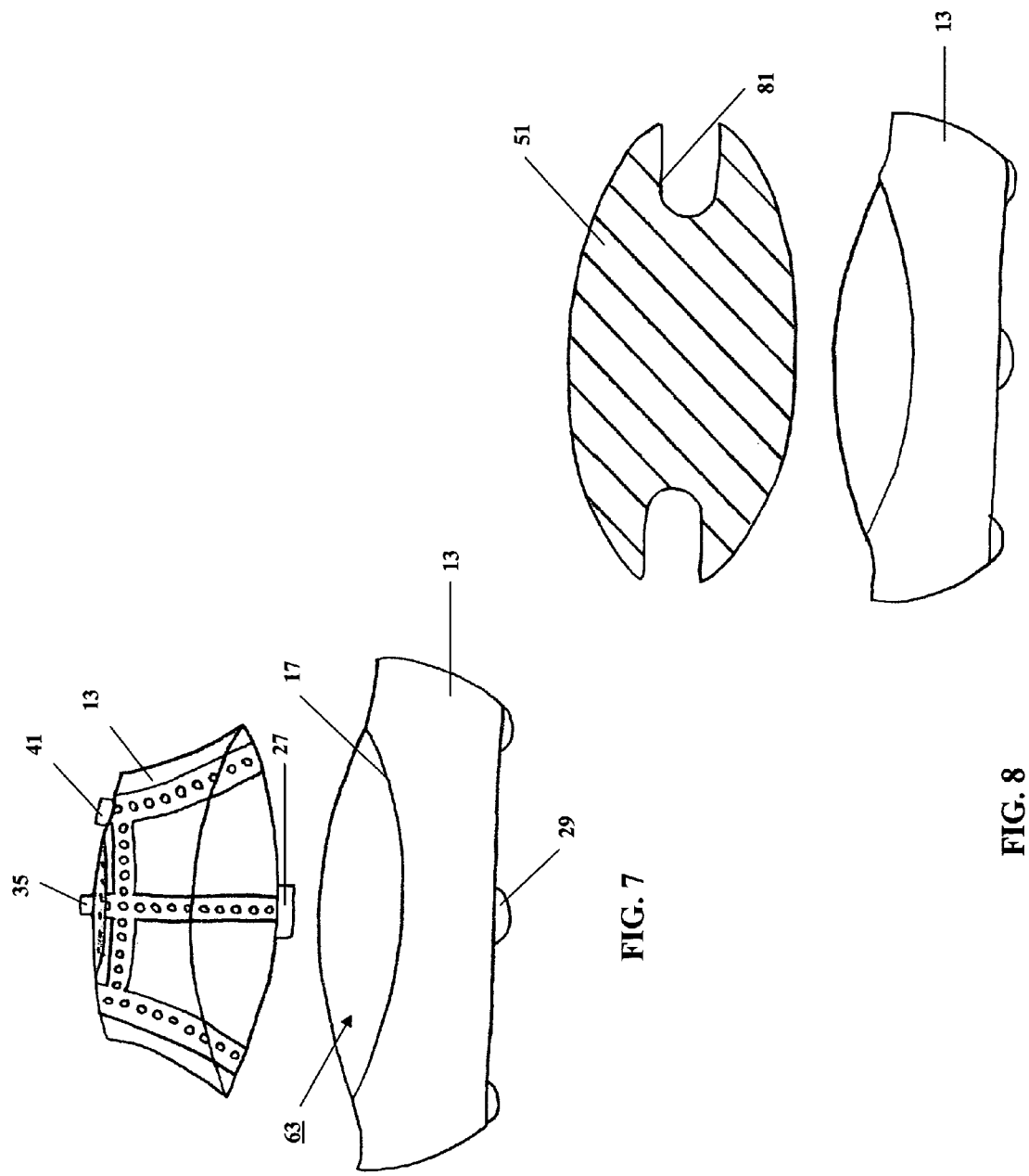

PET WASHING APPARATUS AND METHOD

The present application claims the benefit of, and priority to, the filing date of each of U.S. Provisional Application Ser. No. 61/216,164, filed on May 14, 2009. T*he* disclosure is hereby incorporated by reference for all purposes and made a part of the present *disclosure*.

BACKGROUND OF THE INVENTION

The present invention relates generally to a method and an apparatus for use in the care of pets. More particularly, the invention is directed to an apparatus and method for the handling of the pet, and more particularly, handling of the pet during wash.

SUMMARY OF THE INVENTION

In one aspect, a pet washing apparatus is provided having a base including a washing floor board for positioning a pet and a top part engageable with the lower base. The top part further includes a cover positionable at least partly over the floor board to define, at least partly, a contained wash space. Preferably, the washing apparatus also includes a nozzle supported on the cover and operably positioned to spray downwardly onto the base. The apparatus may also include a shower head supported downwardly from the cover including the nozzle, and with a hose connection for an external water source. More preferably, the cover includes arcuate cut-out sections to partially expose the base and/or provide access to the wash space. The cover may also be transparent to allow observation of the workspace.

In another aspect, a washing apparatus is provided having a base including a washing floor board and a cover detachably engaged with the base. The cover is positioned above the floor board to define a bounded wash space thereunder. The washing apparatus further includes a liquid delivery system supported on the cover, including a nozzle operably positioned above the wash space. The cover is of a transparent material and includes arcuate cut-out sections to partially expose the wash space and define an opening to the wash space.

BRIEF DESCRIPTION OF THE DRAWINGS

FIG. 1 is a simplified schematic illustration of a pet washing apparatus according to the present invention;

FIG. 2 is an elevation view of a pet washing apparatus according to one embodiment of the present invention;

FIG. 3 is a top view of the pet washing apparatus;

FIG. 4 is an end view of the pet washing apparatus;

FIG. 5 is an upward-looking view of the underside of a cover as shown in FIG. 3;

FIG. 6 is a bottom view of the pet washing apparatus;

FIG. 7 is a side view of the pert washing apparatus, with the cover separated from a base of the apparatus;

FIG. 8 is a simplified side view illustration of the pet washing apparatus with a floor board mat for the apparatus in isolated view;

DETAILED DESCRIPTION OF PREFERRED EMBODIMENTS OF THE INVENTION

Figure 9:
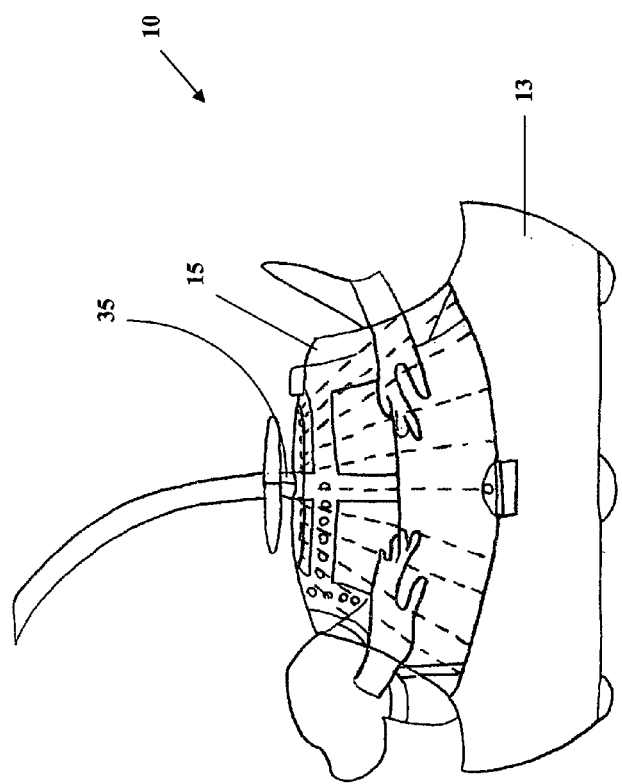
FIG. 9 is a side view illustration of the pet washing apparatus in a washing mode.

The present invention is directed generally to a method and apparatus for washing a pet. The preferred apparatus provides a housing or station 10 in which a pet may be conveniently situated for wash by a handler or owner. Referring first to the schematic of FIG. 1, the pet washing apparatus or housing 10 preferably has two major parts: a lower base 13 for supporting the pet and a cover 15 disposed over the lower base 13. The base 13 is preferably tub shaped having upwardly extending side walls 17 (most preferably, all-around) and a washing floor board 19 (not shown in FIG. 1). In preferred embodiments, the cover 15 is made of a generally transparent polymeric material to allow observation of the floor board 19. As will be shown, the cover 15 supports a shower head 31 for washing a pet on the base 13. The cover 15 is readily removably detachable with the lower base 13 to facilitate pet care and handling.

The base 13 is preferably made of a plastic utilizing bright colors (e.g., structural foam or web, or lightweight polycarbon material), which allow easy handling and transport of the housing 10. Referring also to each of FIGS. 2-8, the floor board 19 is sufficiently wide to hold pets of different sizes. Similarly, the upwardly extending sidewalls 17 has a height sufficient to retain the pet within the area of the floor board 19. In some embodiments, the sidewalls 17 will provide a lower wall or opening to facilitate placement and removal of the pet to and from the floor board 19. In one aspect of the invention, a no-slip rubber mat is set on the floor board 19 to provide traction and grip. In other embodiments, the floor board 19 may be provided with several coarse strips for traction. In yet further embodiments, the sidewalls 17 are provided with a ledge upon which an elevated platform 51 is supported, as also shown in FIG. 8. The elevated platform 51 allows use of the apparatus 10 with smaller pets.

Moreover, the floor board 19 is provided with adjustable drains 23 to drain the floor board 19. Preferably, the floor board 19 is raised about the center and sloped downwardly toward the front and back to facilitate drainage. As best shown by the bottom view of FIG. 6, two drains 23 are provided, with one drain placed near the back of the floor board 19 and another placed toward the front of the floor board 19. In some embodiments, the drains 23 are located throughout, with the expectation that the drains 23 need not be manually closeable. As illustrated in FIG. 1, the drains 23 drain water from the floor board 19 through the base 13 and onto the surface beneath the base 13. The platform 51 also provides cut-outs 81 for run-off of water from the platform 51 and proximal access to the drains 23. For preferred performance, the drains 23 may be configured or further equipped so as to stop and capture pet hair. The base 13 is provided with escalated ball-shaped legs 29 that sufficiently elevates the base 13 to allow clearance and drainage of wash water from the area of the housing 10.

In yet another aspect of the invention, the housing 10, or more particularly, the base 13 is provided with one or more retaining collar attachments 43, as shown in FIG. 3. Snap-on attachment points on the sidewalls 17 (or on the cover 15) secures the collar attachment 43 to the housing and, thus, the pet to the housing 10. The one or more collar attachments 43 allow a handler to further retain the pet within the area of the floor board 19 during wash. In the illustrated embodiment, one collar attachment 45 is shown secured near one open end of the housing 10 to allow the pet's head to be free from under the cover 15.

The cover 15 is preferably made with a clear, transparent polycarbonate plastic (e.g., flexiglass or acrylic). The cover 15 may be made of multiple sections that may be moveable and mutually slidable to adjust the opening and access to the floor board 19. It is believed that such materials, besides providing a cover, provides a calm, soothing and comfortable environment for the pet during wash. It also allows the user to observe the pet in the housing 10. The base 13 is preferably also made of plastic, and thus, is lightweight and easy to handle. The cover 15 is provided with snap-on locking mechanisms 27 that readily secures the cover 15 with the base 13 of the pet washing apparatus 10. The easy to use locking mechanisms 27 are preferably provided along the sidewalls 17 and the bottom rim of the cover 15, as best shown in FIGS. 2 and 7. The cover 15 is, therefore, easily detachable from the base 13, thereby facilitating handling of the pet before, during, and after wash. The cover 15 is preferably sized in correspondence with the size of the pet intended. Thus, it is contemplated that the housing 10 will come in a variety of sizes to accommodate the various sizes of pets. The use of the platform 51 provides further flexibility and is particularly advantageous for users who have several pets of more than one size category.

In preferred embodiments, the cover 15 does not entirely cover the area of the base 13 or floor board 19. Instead, as shown in the Figures, the cover 15 has a converse or arcuate profile at opposite ends. Open ended sections 49, as indicated in FIGS. 2 and 5, are provided by the arcuate cut-outs and facilitate handling and ready access to the pet. The open sections 49 also provide comfort and ease for the pet. Finally, the open section of the cover 15 reduces the weight of the cover 15 and facilitates handling thereof.

Referring to the underside view of the cover 15 in FIG. 5, the cover 15 is preferably provided with a shower head 31. The shower head 31 is fixed to the underside of the cover 15. In this embodiment, the shower head 31 is configured and intended to provide substantial shower coverage of the floor board 19 and the pet that is maintained thereon. The shower head 31 has an oval shape and is equipped within an arrangement of nozzles 33, as is known in the art. Referring to FIG. 3, the shower head 31 is further provided with a main inlet 35 that also serves as a hose connection for an external water source. This function is best illustrated in FIG. 9, wherein a garden hose 57 or equivalent flexible conduit is connected to main inlet 35 to deliver water to the shower head 31. The hose connection 35 may be provided with a simple on and off valve, or a valve that facilitates regulation of the water flow and the nozzles 33. In further embodiments, a manifold may be provided in fluid communication with the main inlet 35. Such a valve manifold is equipped with multiple ports to allow communication with multiple sources. For example, the manifold may be employed with a liquid (or powder) soap reservoir/dispenser, shampoo or conditioner dispenser, flea and tick conditioner/medication source, or aromatization source. The manifold may also include reservoirs and compartments to house the liquid stream constituents or include component hook-ups or nozzles to allow direct connections of source bottles or containers to the manifold and delivery system.

Returning to the underside view of the cover 15 in FIG. 5, the housing 10, or more particularly, the cover 15, is provided with an air drying system. The air drying system includes a conduit network 39 that is fixed to the underside of the cover 15. The network 39 includes multiple branches which are equipped with outlets or nozzles for delivering warm or ambient air downward onto the area of the floor board 19. The network 39 includes multiple branches to provide adequate coverage, and therefore, quick drying, of a pet maintained on the floor board 19. Some branches of the network 39 extend from the apex of the cover 15 and downwardly toward the base 15. In this way, air drying nozzles may be positioned to direct warm or ambient air to the sides and legs of the pet. The network 39 further includes an air hook-up or connection 41 that extends outward atop the cover 15. The connection 41 is adapted to connect to an ordinary hair dryer (or even a vacuum hose operated as blowing mechanism) that can deliver warm air through the network 39. In further embodiments, the air drying system or portions thereof, including the conduit network and/or air hook-up or connection may be provided, or connectible with, on the base 13 (e.g., sidewalls 17 or floor board 19).

For purposes of the present description, the sidewalls 17, floorboard 19, and the cover 15 are described as defining a contained wash space 63. The contained wash space is, therefore, the space between the floorboard 19 and the cover 15 in which the pet is supported and situated (see FIGS. 8 and 9). This contained wash space 63 is observable due to the transparent cover 15 and the open end sections 49. The contained wash space 63 is also made readily accessible due primarily to the open end sections 49. Furthermore, the contained wash space 63 is contained or bounded, and thereby secured, by the sidewalls 17 and cover 15. Finally, in yet another aspect of the invention, the contained washing area is operable and communicable with a shower system, air drying system, and a drain system.

FIG. 9 illustrates a washing mode of the pet care apparatus of the invention. A medium to large dog is maintained in the housing 10 under the transparent cover 35. The open end sections 49 allow the dog to fit under the cover 35 without being too confined. Use of the collar restraints 43, as well as the configuration of the housing 10, helps to maintain the dog during wash. The open end sections 49 also allows the user to reach under the cover 15, handle the dog, and to lather and rinse the dog throughout the wash mode. The cover 35 functions to protect the user, however, from the water spray under the cover 35 as water is delivered via the shower head 31. The cover 35 also protects the user from water and soap that may be dispersed or shaken off from the dog.

Figure 10:
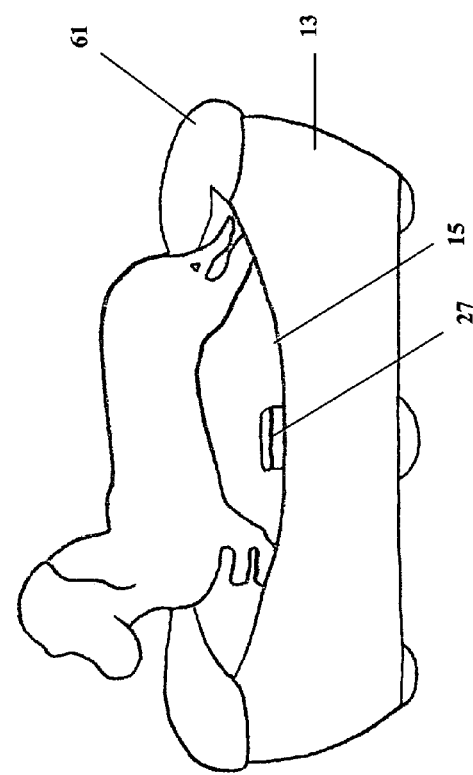
FIG. 10 is a simplified illustration of the pet washing apparatus in a rest mode.

FIG. 10 illustrates yet another alternative use, function, and embodiment of the present invention. In this embodiment, the cover 15 is removed, turned over, and stowed in the base 13. In FIG. 10, the snap-on locking mechanism 27 is shown extending upwardly from inside the base 13. The cover 15, in this stowed position provides a bed or rest support for the pet. The lightweight, but structurally sound bed adequately supports the weight of the pet, and accommodates a form-fitting pillow or cushion 61. The elevated platform 51 may also function as support for the pillow 61 in some applications.

The foregoing description of the present invention has been presented for purposes of illustration and description. It is to be noted that the description is not intended to limit the invention to the various apparatus and processes disclosed herein. Various aspects of the invention as described above may be applicable to other types of washing or grooming apparatus and methods. Such variations of the invention will become apparent to one skilled in the relevant art provided with the present disclosures. Moreover, variations or modifications to one or more of the features of the embodiments presented herein is also likely. For example, the washing apparatus may incorporate other pet securing devices and product dispensing devices which are available in the marketplace. Consequently, variations and modifications commensurate with the above-teachings, and the skill and knowledge of the relevant art, are within the scope of the invention. The embodiments described and illustrated are also intended to explain the best modes for practicing the invention, and to enable others skilled in the art to utilize the invention and other embodiments with various modifications required by the particular application or uses of the present invention.

What is claimed is:

1. A pet washing apparatus comprising:
a base including a washing floor board for positioning a pet; and
a top part engageable with the base and detachable therefrom, including a cover positionable at least partly over the floor board to define, at least partly, a contained wash space thereunder; and
wherein the base has a perimeter defining a contained area of the base, the cover engaging less than an entirety of the perimeter to define a pair of open end sections over the contained area for accessing the contained wash area, each open end section being located adjacent one end of the base and cover and extending from the cover downward to and over the base;
wherein the base includes upstanding side walls providing the perimeter about the washing floor board;
wherein the sidewalls form an all-around upstanding side wall and the perimeter is an elevated upper perimeter, and wherein the covet extends over and engages a middle section of the upper perimeter bisecting lateral sections of the upper perimeter, and is transparent to allow observation of the contained wash space; and
wherein each open end section is defined, in entirety, by the expanse between an end section of the upper perimeter extending laterally from the middle section and an entire lateral end of the cover disengaged from the middle section and extending upwardly therefrom, such that an opening is positioned over the base and within the perimeter;
wherein each open end section comprises an arcuate cut-out section to partially expose the wash space and define an opening to the wash space, such that the arcuate cut-out section is positioned over a section of the wash space within the perimeter and a length of the cover measured in a lengthwise direction from one arcuate cut-out section to the other arcuate cut-out section is less than a maximum length of the base measured along the same lengthwise direction; and
a liquid delivery system positioned to supply liquid to the base.

2. The washing apparatus of claim 1, said liquid delivery system further comprising a nozzle supported on the cover and operably positioned to spray downwardly onto the contained wash space.

3. The washing apparatus of claim 2, further comprising a shower head supported downwardly from the cover including the nozzle.

4. The washing apparatus of claim 3, wherein the shower head further includes a hose connection.

5. The washing apparatus of claim 3, wherein the base is a tub having a drain.

6. The washing apparatus of claim 1, wherein the cover and the base are equipped with mutually engageable snap-on connections for detachably attaching the cover to the base.

7. The washing apparatus of claim 1, wherein the cover includes an air conduit system supported with the cover and including a plurality of air drying nozzles directed generally inwardly.

8. The washing apparatus of claim 1, further comprising a platform, the sidewalls being equipped to support the platform therein at an elevated position.

9. A pet washing apparatus, comprising: a base for positioning a pet during wash; and
a cover detachably engaged with the base to define, at least partly, a contained wash space therebetween; and
wherein the base has a perimeter defining a contained area of the base, the cover engaging less than an entirety of the perimeter to define a pair of open end sections over the contained area for accessing the contained wash area, each open end section being located adjacent one end of the base and cover and extending from the cover downward to and over the base;
wherein the base includes upstanding side walls providing a perimeter about the washing floor;
wherein the sidewalls form an all-around upstanding side wall and the perimeter is an elevated upper perimeter, and wherein the cover extends over and engages a middle section of the upper perimeter bisecting lateral sections of the upper perimeter, and is transparent to allow observation of the contained wash area; and
wherein each open end section is defined, in entirety, by the expanse between an end section of the upper perimeter extending laterally from the middle section and an entire lateral end of the cover disengaged from the middle section and extending upwardly therefrom, such that an opening is positioned over the base and within the perimeter;
wherein each open end section comprises an arcuate cut-out section to partially expose the wash space and define an opening to the wash space, such that the arcuate cut-out section is positioned over a section of the wash space within the perimeter and a length of the cover measured in a lengthwise direction from one arcuate cut-out section to the other arcuate cut-out section is less than a maximum length of the base measured along the same lengthwise direction; and
a liquid delivery system positioned to supply liquid to the base.

10. The washing apparatus of claim 9, said liquid delivery system further comprising a shower head supported by the cover in a position above the contained wash area.

11. The apparatus of claim 9, further comprising an air delivery system supported by the cover for air drying a pet in the contained wash area.

12. The apparatus of claim 9, said liquid delivery system further comprising a liquid manifold delivery system spaced from the wash area and positioned to deliver a liquid stream onto the wash area, the manifold delivery system being in fluid communication with one or more sources from which to draw constituents of the liquid stream.

13. A washing apparatus comprising:
a base including a washing floor board;
a cover detachably engaged with the base and positioned above the floor board to define a bounded wash space thereunder; and
a liquid delivery system supported on the cover, including a nozzle operably positioned above the wash space;
wherein the base has a perimeter defining a contained area of the base, the cover engaging less than an entirety of the perimeter to define a pair of open end sections over the contained area for accessing the contained wash area, each open end section being located adjacent one end of the base and cover and extending from the cover downward to and over the base;
wherein the cover is of a transparent material and each open end section comprises an arcuate cut-out sections to partially expose the wash space and define an opening to the wash space, such that the arcuate cut-out section is positioned over a section of the wash space within the perimeter and a length of the cover measured in a lengthwise direction from one arcuate cut-out section to the other arcuate cut-out section is less than a maximum length of the base measured along the same lengthwise direction.

* * * * *